US012587115B2

(12) United States Patent
Qin et al.

(10) Patent No.: US 12,587,115 B2
(45) Date of Patent: Mar. 24, 2026

(54) DRIVING CIRCUIT FOR MOTOR SYSTEMS AND CONTROL METHOD THEREOF

(71) Applicant: Chengdu Monolithic Power Systems Co., Ltd., Chengdu (CN)

(72) Inventors: Hongqiang Qin, Hangzhou (CN); Qiming Zhao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 623 days.

(21) Appl. No.: 18/083,761

(22) Filed: Dec. 19, 2022

(65) Prior Publication Data

US 2023/0261594 A1     Aug. 17, 2023

(30) Foreign Application Priority Data

Feb. 15, 2022    (CN) .......................... 202210138388.6

(51) Int. Cl.
| | |
|---|---|
| *H02M 1/32* | (2007.01) |
| *H02M 1/14* | (2006.01) |
| *H02P 6/15* | (2016.01) |

(52) U.S. Cl.
CPC .................................... *H02P 6/153* (2016.02)

(58) Field of Classification Search
CPC ..... H01M 10/482; H01M 50/269; H02P 6/14; H02P 3/12; H02P 23/00; H02P 3/22; H02P 3/24; H02P 2207/03; H02P 3/14; H02P 6/24; H02P 9/02; H02P 2101/45; H02P 25/034; H02P 8/18; H02P 9/04; H02P 2209/07; H02P 25/188; H02P 6/34; H02P 7/281; H02P 9/107; H02P 9/14;

H02P 9/30; H02P 9/48; H02P 23/0077; H02P 25/028; H02P 25/06; H02P 25/062; H02P 25/064; H02P 25/08; H02P 27/08; H02P 6/085

See application file for complete search history.

(56) References Cited

U.S. PATENT DOCUMENTS

| | | | |
|---|---|---|---|
| 8,502,486 | B2 | 8/2013 | Li |
| 8,508,218 | B2 | 8/2013 | Reymond |
| 8,736,209 | B2 | 5/2014 | Zhao |
| 8,963,540 | B2 | 2/2015 | Reymond |
| 9,880,025 | B2 | 1/2018 | Kejik |
| 9,941,816 | B2 | 4/2018 | Liu |
| 10,432,159 | B2 | 10/2019 | Yang |

(Continued)

*Primary Examiner* — Kawing Chan
*Assistant Examiner* — Charles S Laughlin
(74) *Attorney, Agent, or Firm* — Perkins Coie LLP

(57) ABSTRACT

A driving circuit for a motor has a multiplexer, a current polarity detection circuit, a first comparison circuit, a reverse current control circuit, a first bridge circuit, and a second bridge circuit. The multiplexer chooses a voltage at a common node of two switches of the first bridge circuit or a voltage at a common node of two switches of the second bridge circuit as a chosen common node voltage based on a hall sensing signal. The comparison circuit provides a comparison signal by comparing the chosen common node voltage with an input voltage. The reverse current control circuit determines whether to control a low-side switch of the first bridge circuit or a low-side switch of the second bridge circuit to work in a low-dropout linear regulation (LDO) mode based on the comparison signal and a polarity indication signal provided by the current polarity detection circuit.

18 Claims, 8 Drawing Sheets

(56)  References Cited

U.S. PATENT DOCUMENTS

| | | | |
|---|---|---|---|
| 10,451,657 B2 | 10/2019 | Reymond | |
| 10,976,765 B2 | 4/2021 | Yang | |
| 11,522,532 B2 | 12/2022 | Zhang | |
| 2016/0344328 A1* | 11/2016 | Chen | H02P 27/06 |
| 2018/0183364 A1* | 6/2018 | Lee | H02H 9/005 |

* cited by examiner

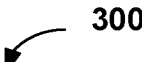

Choosing a first common node voltage at a common node of the first high-side switch and the first low-side switch or a second common node voltage at a common node of the second high-side switch and the second low-side switch as a chosen common node voltage based on a hall sensing signal provided by a hall sensing circuit

301

Providing a comparison signal by comparing the chosen common node voltage with the input voltage

302

Providing a polarity indication signal which indicates the polarity of the driving current

303

Determining whether to control the first low-side switch or the second low-side switch to work in LDO mode based on the comparison signal and the polarity indication signal

DRIVING CIRCUIT FOR MOTOR SYSTEMS AND CONTROL METHOD THEREOF

CROSS-REFERENCE TO RELATED APPLICATIONS

This application claims the benefit of CN application 202210138388.6, filed on Feb. 15, 2022, and incorporated herein by reference.

BACKGROUND OF THE INVENTION

1. Field of the Invention

The present invention generally relates to electrical circuits, and more particularly, relates to driving circuits for motors and control methods thereof.

2. Description of Related Art

Motor drivers are widely used in fans of central processing units (CPUs). FIG. 1 shows a prior art motor driver system 100. The motor driver system 100 comprises a motor driving circuit to provide a driving current I for a motor 102. The motor driving circuit comprises an output stage circuit 101, an input capacitor $C_{in}$, a Zener diode VZ coupled in parallel with the input capacitor $C_{in}$, and a power supply 103 which is coupled to the output stage circuit 101 via a protection device DO. The output stage circuit 101 comprises a first bridge circuit and a second bridge circuit. The first bridge circuit comprises a first switch M1 and a second switch M2, and the second bridge circuit comprises a third switch M3 and a fourth switch M4. The first switch M1 and the second switch M2 are coupled in series between an input voltage VIN and a ground, the third switch M3 and the fourth switch M4 are coupled in series between the input voltage VIN and the ground. An equivalent circuit model of the motor 102 comprises an equivalent parasitic inductance Ls, an equivalent resistance Rs and an induced electromotive force $V_f$. A first terminal "A" of the motor 102 is coupled to a common node of the first switch M1 and the second switch M2, and a second terminal "B" of the motor 102 is coupled to a common node of the third switch M3 and the fourth switch M4.

When the first switch M1 and the fourth switch M4 are turned ON, and the second switch M2 and the third switch M3 are turned OFF, the driving current I flows to the ground through the input voltage VIN, the first switch M1, the equivalent parasitic inductance Ls, the equivalent resistance Rs, the induced electromotive force $V_f$ and the fourth switch M4. The driving current I flows through the equivalent parasitic inductance Ls in a positive direction shown in FIG. 1.

The motor 102 has a rotor and a stator. To keep the rotor rotating in a certain direction, the direction of the driving current I should be changed after the rotor passes an aligned position where the magnetic poles of both the rotor and the stator are on the same line. For example, at the moment when the rotor is at the aligned position, the second switch M2 and the third switch M3 are turned ON, and the first switch M1 and the fourth switch M4 are turned OFF. Because the current of the inductor cannot change instantaneously, the driving current I maintains its direction for a short time period, and the driving current I passes through the second switch M2, the equivalent parasitic inductance Ls, the equivalent resistance Rs, the induced electromotive force $V_f$, and the third switch M3, and flows back to the input voltage VIN. FIG. 2 shows waveforms of the prior art motor driver system 100. The driving current I flowing back to the input voltage VIN causes voltage spikes upon the input capacitor $C_{in}$, as a curve $V_{CIN}$ shown in FIG. 2. Wherein a hall sensing signal $V_{HALL}$ repeatedly transforms between a positive potential and a negative potential based on a rotation angle ω of the rotor.

SUMMARY OF THE INVENTION

Embodiments of the present invention are directed to a driving circuit for a motor, comprising an output stage circuit, a hall sensing circuit, a multiplexer, a current polarity detection circuit, a first comparison circuit, and a reverse current control circuit. The output stage circuit is configured to provide a driving current for the motor and comprises a first bridge circuit and a second bridge circuit coupled in parallel between an input voltage and a ground. The first bridge circuit has a first high-side switch and a first low-side switch coupled in series, and a first common node voltage is formed at a common node of the first high-side switch and the first low-side switch. The second bridge circuit has a second high-side switch and a second low-side switch coupled in series, and a second common node voltage is formed at a common node of the second high-side switch and the second low-side switch. The first bridge circuit and the second bridge circuit are controlled by a plurality of switching control signals. The hall sensing signal is configured to provide a hall sensing signal. The multiplexer receives the first common node voltage, the second common node voltage, and the hall sensing signal, and is configured to choose the first common node voltage or the second common node voltage as a chosen common node voltage based on the hall sensing signal. The current polarity detection circuit is configured to provide a polarity indication signal indicating a polarity of the driving current. The reverse current control circuit, configured to determine whether to control the first low-side switch or the second low-side switch to work in a low-dropout linear regulation (LDO) mode based on the first comparison signal and the polarity indication signal.

Embodiments of the present invention are directed to a driving circuit for a motor, comprising a first bridge circuit, a second bridge circuit, a first comparison circuit, a current polarity detection circuit, and a reverse current control circuit. The first bridge circuit and the second bridge circuit are coupled in parallel between an input voltage and a ground to provide a driving current for the motor. The first bridge circuit has a first high-side switch and a first low-side switch coupled in series, and the second bridge circuit has a second high-side switch and a second low-side switch coupled in series. A first common node voltage is developed at a common node of the first high-side switch and the first low-side switch, and a second common node voltage is developed at a common node of the second high-side switch and the second low-side switch. The first comparison circuit is configured to provide a first comparison signal via comparing one of the first common mode voltage and the second common mode voltage with the input voltage. The current polarity detection circuit is configured to provide a polarity indication signal indicating a polarity of the driving current. The reverse current control circuit is configured to determine whether to control the first low-side switch or the second low-side switch to work in a low-dropout linear regulation (LDO) mode based on the first comparison signal and the polarity indication signal.

Embodiments of the present invention are directed to a control method for a motor driving circuit. The motor driving circuit comprises a first bridge circuit and a second bridge circuit coupled in parallel between an input voltage and a ground to provide a driving current for a motor. The first bridge circuit comprises a first high-side switch and a first low-side switch coupled in series, and the second bridge circuit comprises a second high-side switch and a second low-side switch coupled in series. The control method comprises choosing a first common node voltage at a common node formed by the first high-side switch and the first low-side switch or a second common node voltage at a common node formed by the second high-side switch and the second low-side switch as a chosen common node voltage based on a hall sensing signal provided by a hall sensing circuit, providing a comparison signal by comparing the chosen common node voltage with the input voltage, providing a polarity indication signal which indicates a polarity of the driving current, and determining whether to control the first low-side switch or the second low-side switch to work in a low-dropout linear regulation (LDO) mode based on the comparison signal and the polarity indication signal.

These and other features of the present invention will be readily apparent to persons of ordinary skill in the art upon reading the entirety of this disclosure, which includes the accompanying drawings and claims.

BRIEF DESCRIPTION OF DRAWINGS

The present invention can be further understood with reference to the following detailed description and the appended drawings, wherein like elements are provided with like reference numerals.

FIG. 8 illustrates a control method 300 for a motor driving circuit in accordance with an embodiment of the present invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
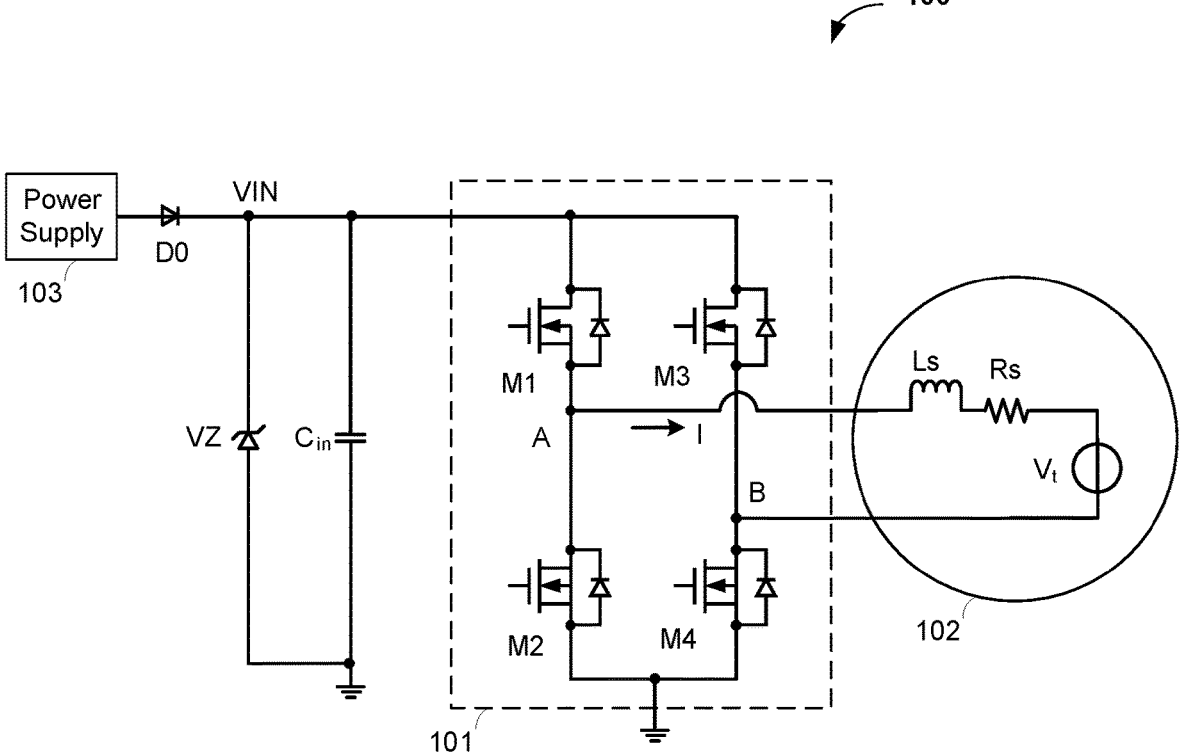
FIG. 1 shows a prior art motor driver system 100.
Figure 2:
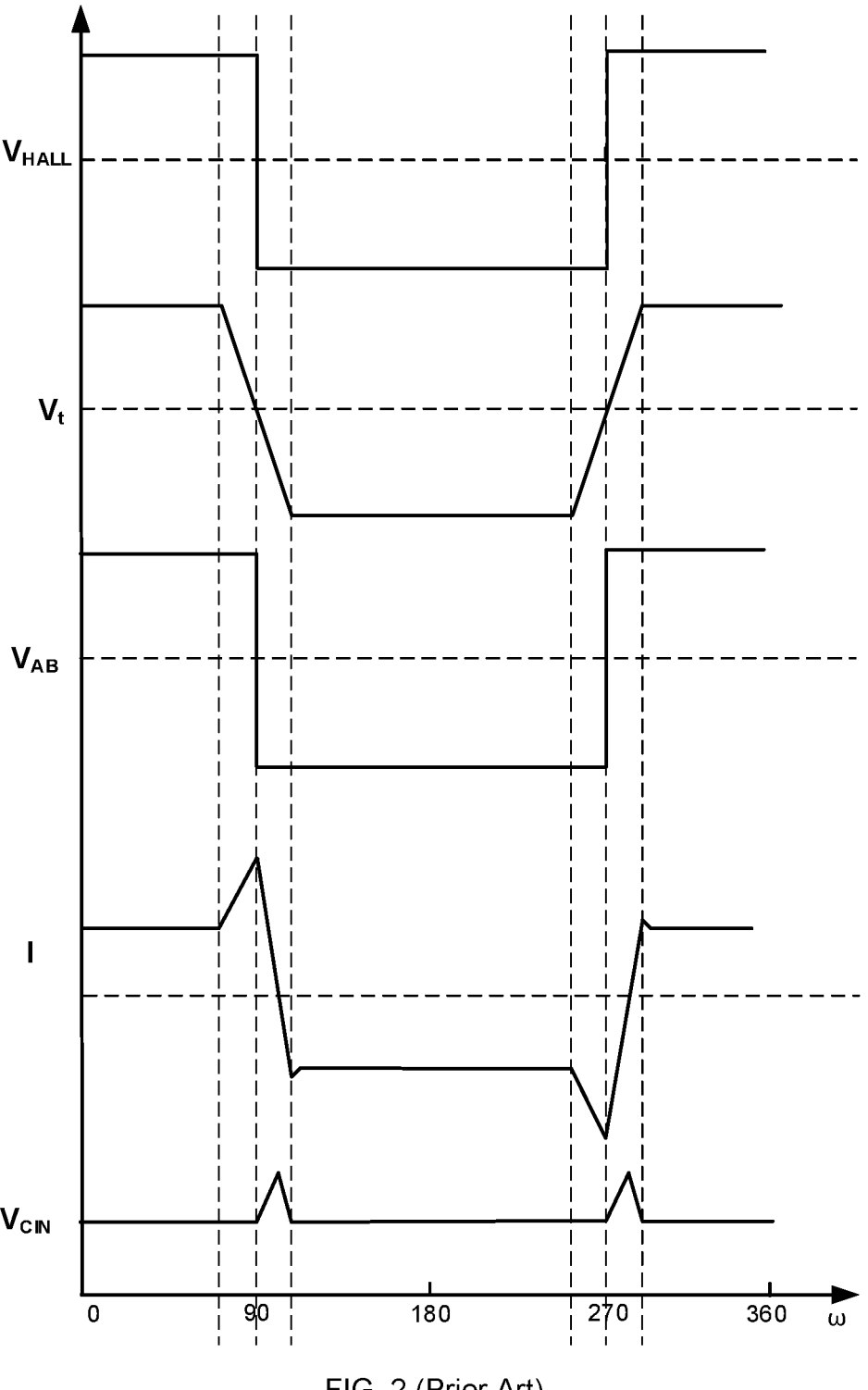
FIG. 2 shows waveforms of the prior art motor driver system 100.
Figure 3:
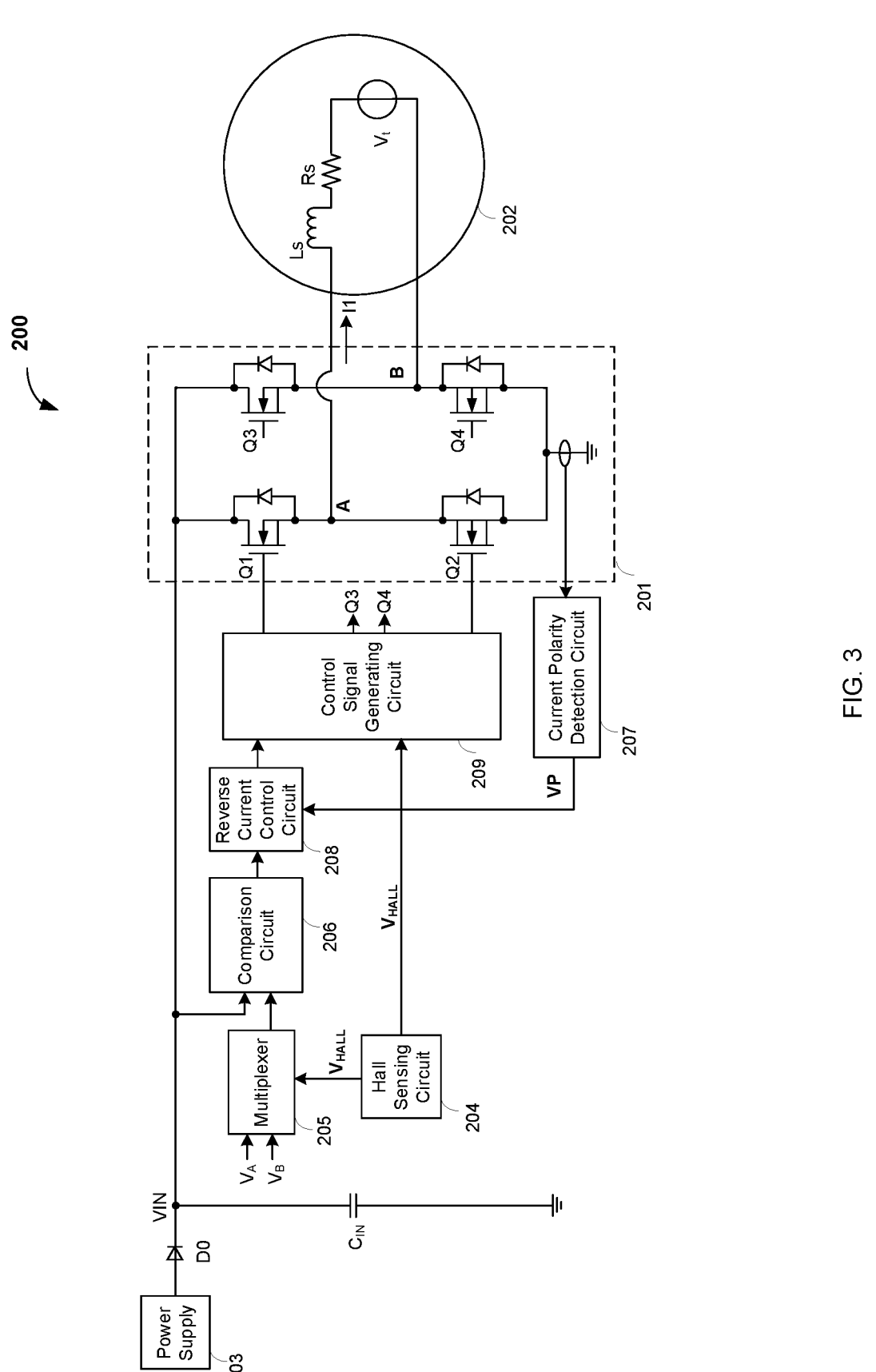
FIG. 3 schematically illustrates a motor driver system 200 in accordance with an embodiment of the present invention.

FIG. 3 schematically illustrates a motor driver system 200 in accordance with an embodiment of the present invention. As shown in FIG. 3, the motor driver system 200 comprises a motor driving circuit to provide a driving current I1 for a motor 202. The motor driving circuit comprises an output stage circuit 201, an input capacitor $C_{IN}$, a Zener diode VZ coupled in parallel with the input capacitor $C_{IN}$, a power supply 203 coupled to the output stage circuit 201 via a protection device D0, a hall sensing circuit 204, a multiplexer 205, a comparison circuit 206, a current polarity detection circuit 207, a reverse current control circuit 208, and a control signal generating circuit 209.

The output stage circuit 201 comprises a first bridge circuit and a second bridge circuit. The first bridge circuit and the second bridge circuit are coupled in parallel between an input voltage VIN and a ground. The first bridge circuit comprises a high-side switch Q1 and a low-side switch Q2, and the second bridge circuit comprises a high-side switch Q3 and a low-side switch Q4. The hall sensing circuit 204 generates a hall sensing signal $V_{HALL}$ based on a position of a rotor of the motor 202, and provides the hall sensing signal $V_{HALL}$ to the multiplexer 205 and the control signal generating circuit 209. The control signal generating circuit 209 generates a plurality of switching control signals based on the hall sensing signal $V_{HALL}$ to control the output stage circuit 201, and thus controls the driving current I1 which flows through the motor 202.

The multiplexer 205 comprises a first input terminal, a second input terminal, a control terminal and an output terminal. The first input terminal of the multiplexer 205 is coupled to a common node "A" of the high-side switch Q1 and the low-side switch Q2 to receive a common node voltage $V_A$. The second input terminal of the multiplexer 205 is coupled to a common node "B" of the high-side switch Q3 and the low-side switch Q4 to receive a common node voltage $V_B$. The control terminal of the multiplexer 205 is coupled to the hall sensing circuit 204 to receive the hall sensing signal $V_{HALL}$. The multiplexer 205 chooses the common node voltage $V_A$ or the common node voltage $V_B$ as a chosen common node voltage based on the hall sensing signal $V_{HALL}$, and provides the chosen common node voltage at the output terminal of the multiplexer 205.

The comparison circuit 206 comprises a first input terminal, a second input terminal and an output terminal. The first input terminal of the comparison circuit 206 receives the input voltage VIN, and the second input terminal of the comparison circuit 206 is coupled to the output terminal of the multiplexer 205. The comparison circuit 206 compares the chosen common node voltage with the input voltage VIN and provides a comparison signal CMP1 at the output terminal of the comparison circuit 206.

The current polarity detection circuit 207 provides a polarity indication signal VP which indicates a polarity of the driving current I1. For example, the driving current I1 shown in FIG. 3 flows in a positive direction, or in other words, the polarity of the driving current I1 in FIG. 3 is positive. The reverse current control circuit 208 receives the comparison signal CMP1 and the polarity indication signal VP, and determines whether to control the low-side switch Q2 or the low-side switch Q4 to work in a low-dropout linear regulation (LDO) mode (that is, to maintain the common node voltage $V_A$ at a certain level by adjusting a driving voltage of the corresponding switch Q2 or to maintain the common node voltage $V_B$ at a certain level by adjusting a driving voltage of the corresponding switch Q4) based on the comparison signal CMP1 and the polarity indication signal VP, In general, the control signal generating circuit 209 provides 4 control signals based on the hall sensing signal $V_{HALL}$ to control the switches Q1-Q4 of the output stage circuit 201 respectively.

When the chosen common node voltage is larger than the input voltage VIN and the polarity indication signal VP indicates that the driving current I1 changes its polarity, the reverse current control circuit 208 is enabled, and the output terminal of the reverse current control circuit 208 is coupled to a control terminal of the low-side switch Q2 or a control terminal of the low-side switch Q4 to control the low-side switch Q2 or the low-side switch Q4 to work in the LDO mode. Specifically, in one embodiment, when the common node voltage $V_A$ is chosen by the multiplexer 205, if the common node voltage $V_A$ is larger than the input voltage VIN and the polarity indication signal VP indicates that the polarity of the driving current I1 changes from positive to negative, then the low-side switch Q2 is configured to work in the LDO mode. When the common node voltage $V_B$ is chosen by the multiplexer 205, if the common node voltage $V_B$ is larger than the input voltage VIN and the polarity indication signal VP indicates that the polarity of the driving current I1 changes from negative to positive, then the low-side switch Q4 is configured to work in the LDO mode.

Figure 4:
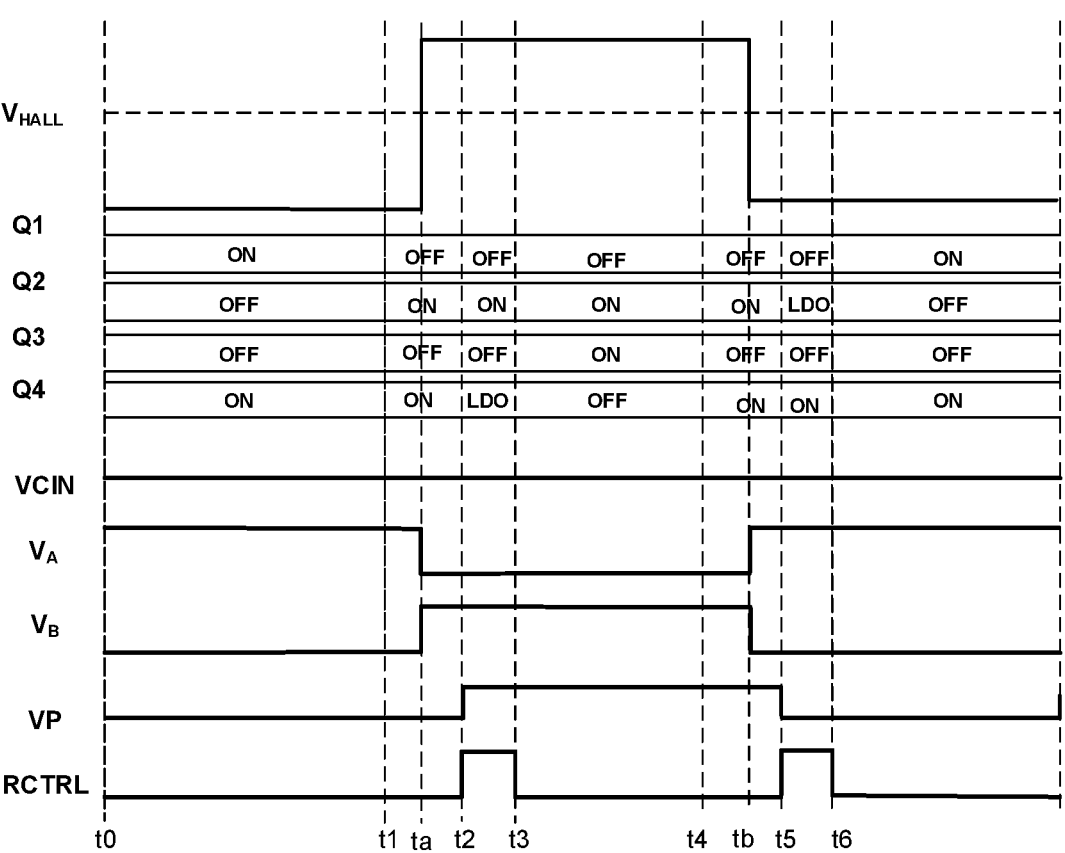
FIG. 4 shows waveforms of the motor driving circuit of FIG. 3 in accordance with an embodiment of the present invention.

FIG. 4 shows waveforms of the motor driving circuit of FIG. 3 in accordance with an embodiment of the present invention. As shown in FIG. 4, during a time period t0-t2, the low-side switch Q4 maintains ON, the switches Q1 and Q2 of the first bridge circuit are turned ON and OFF complementarily to provide the driving current I1 for the motor 202. The driving current I1 flows from the common node "A" to the common node "B".

During a time period t0-ta, the hall sensing signal $V_{HALL}$ is negative. The multiplexer 205 chooses the common node voltage $V_A$ to be compared with the input voltage VIN based on the hall sensing signal $V_{HALL}$. During a time period ta-t2, the hall sensing signal $V_{HALL}$ is positive. The multiplexer 205 chooses the common node voltage $V_B$ to be compared with the input voltage VIN based on the hall sensing signal $V_{HALL}$. Because the polarity indication signal VP remains unchanged, which means the direction of the driving current I1 has not changed, a reverse current control signal RCTRL provided by the reverse current control circuit 208 remains unchanged and does not control the low-side switch Q2 or the low-side switch Q4 to work in the LDO mode.

At a time t2, the driving current I1 changes its polarity and starts to flow from the common node "B" to the common node "A", and the polarity indication signal VP transforms from logic low to logic high. In some examples, a voltage level between a high threshold voltage (e.g., 2V) and a voltage source VCC (e.g., 3.3V) is considered as logic high ("1"), a voltage level between zero voltage (0 V) and a low threshold voltage (e.g., 1V) is considered as logic low ("0"). Meanwhile, the hall sensing signal $V_{HALL}$ is positive, and the common node voltage $V_B$ is chosen to be compared with the input voltage VIN. Because the common node voltage $V_B$ is larger than the input voltage VIN and the polarity indication signal VP indicates that the driving current I1 changes its polarity, the reverse current control signal RCTRL is transformed to be logic high. Therefore, during a time period t2-t3, the low-side switch Q4 is configured to work in the LDO mode, the common node voltage $V_B$ maintains at a certain level, and the driving current I1 flows through the low-side switch Q2 and the low-side switch Q4 to avoid causing voltage spikes upon the input capacitor $C_{IN}$.

During a time period t3-t5, because the polarity of the driving current I1 is not changed, the reverse current control circuit 208 is disabled and the reverse current control signal RCTRL cannot be enabled. The control signal generating circuit 209 generates a plurality of switching control signals based on the hall sensing signal $V_{HALL}$ to control the output stage circuit 201. More specifically, during the time period t3-t5, the low-side switch Q2 maintains ON, and the low-side switch Q4 and the high-side switch Q3 are turned ON and OFF complementarily.

At a time t5, the driving current I1 changes its polarity, and the polarity indication signal VP transforms to be logic low. Meanwhile, the hall sensing signal $V_{HALL}$ is negative, and the common node voltage $V_A$ is chosen to be compared with the input voltage VIN. During a time period t5-t6, the low-side switch Q2 is configured to work in the LDO mode based on a comparison result between the common node voltage $V_A$ and the input voltage VIN, the common node voltage $V_A$ maintains at a certain level, and the driving current I1 flows through the low-side switch Q2 and the low-side switch Q4 to avoid causing the voltage spikes upon the input capacitor $C_{IN}$.

To sum up, when the polarity indication signal VP indicates that the driving current I1 changes its polarity and the chosen common node voltage increases to the level of the input voltage VIN, the corresponding low-side switch is controlled to work in the LDO mode, otherwise the four switches in the output stage circuit 201 are controlled based on traditional switching control signals. One with ordinary skill in the art should understand that the waveforms of the motor driving circuit of FIG. 3 is not limited by the example shown in FIG. 4.

Figure 5:
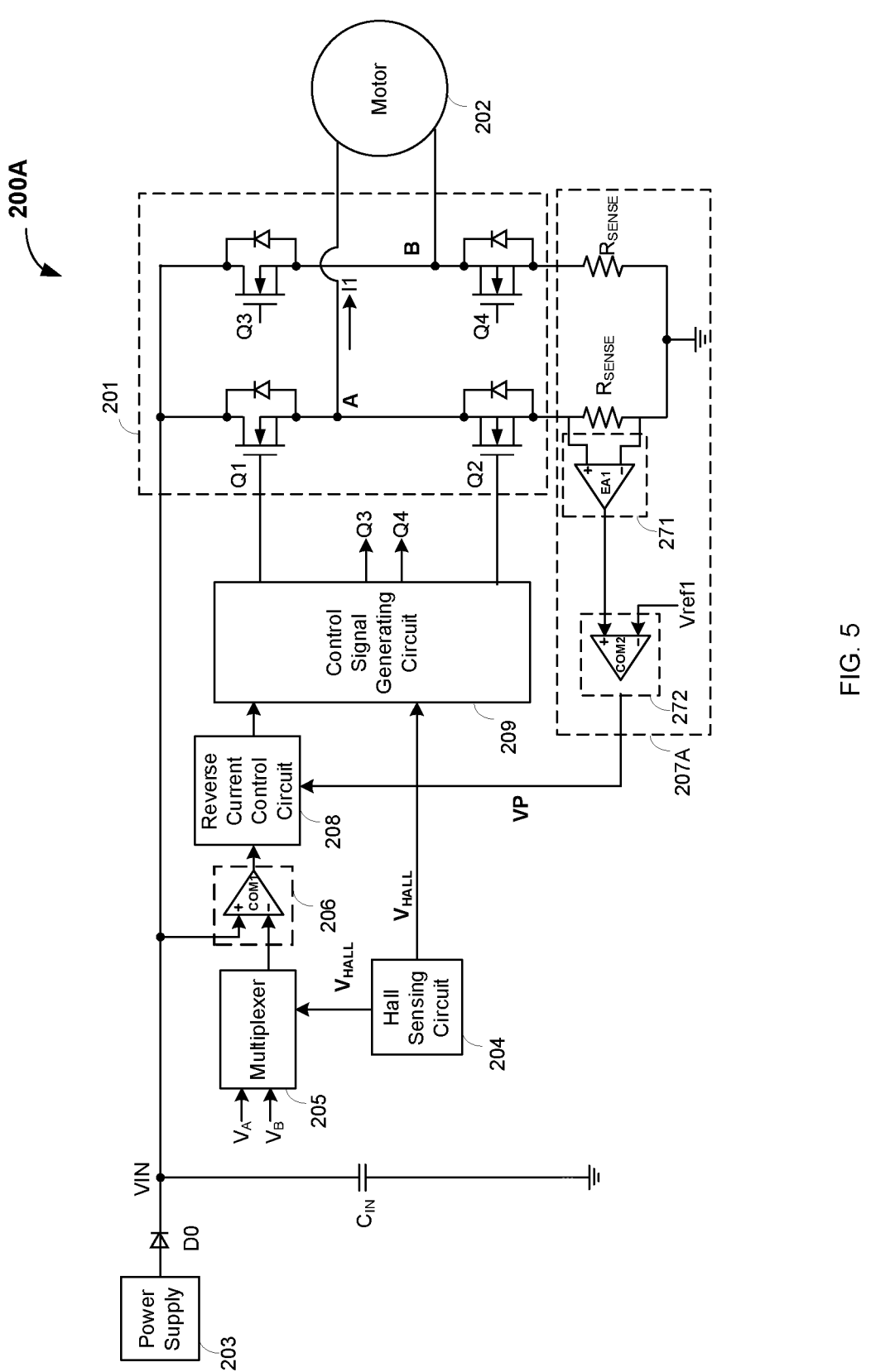
FIG. 5 schematically illustrates a motor driver system 200A in accordance with another embodiment of the present invention.

FIG. 5 schematically illustrates a motor driver system 200A in accordance with another embodiment of the present invention. Compared with FIG. 3, the comparison circuit 206 shown in FIG. 5 further comprises a comparator COM1. The comparator COM1 has a non-inverting input terminal, an inverting input terminal, and an output terminal. The non-inverting input terminal receives the input voltage VIN, and the inverting input terminal is coupled to the output terminal of the multiplexer 205 to receive the chosen common node voltage. The comparator COM1 provides a comparison signal CMP1 at its output terminal via comparing the chosen common node voltage with the input voltage VIN. When the chosen common node voltage is larger than the input voltage VIN and the driving current I1 changes its polarity, the reverse current control circuit 208 is enabled to provide the reverse current control signal RCTRL. The reverse current control signal RCTRL controls the low-side switch Q2 or the low-side switch Q4 to work in the LDO mode to avoid the driving current I1 flowing back to the input voltage VIN, so as to reduce the voltage spikes upon the input capacitor $C_{IN}$.

As shown in FIG. 5, a current polarity detection circuit 207A comprises one or a plurality of sensing resistors $R_{SENSE}$, an operational amplifier 271, and a zero crossing detection comparison circuit 272. As shown in FIG. 5, each sensing resistor $R_{SENSE}$ is coupled in series between one low-side switch of the output stage circuit 201 and the ground. In other embodiments, the sensing resistors $R_{SENSE}$ may be coupled between the common node "A" and the common node "B".

Two input terminals of the operational amplifier 271 are coupled across the sensing resistor $R_{SENSE}$ between one low-side switch of the output stage circuit 201 and the ground respectively to provide a current sensing signal by sampling a voltage across the sensing resistor $R_{SENSE}$. The zero crossing detection comparison circuit 272 provides the polarity indication signal VP at its output terminal via comparing the current sensing signal with a reference voltage Vref1.

Figure 6:
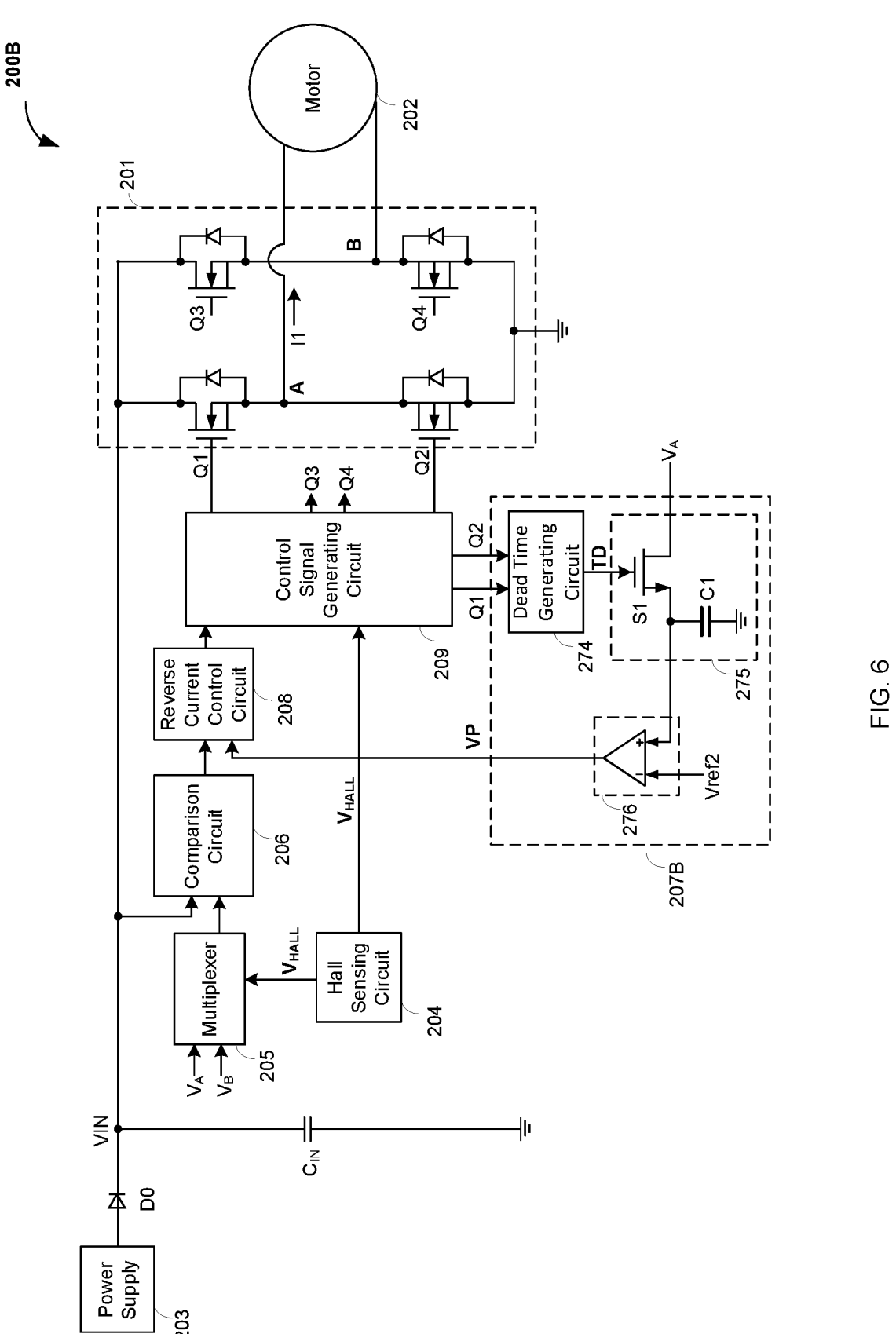
FIG. 6 schematically illustrates a motor driver system 200B in accordance with another embodiment of the present invention.

FIG. 6 schematically illustrates a motor driver system 200B in accordance with another embodiment of the present invention. As shown in FIG. 6, a current polarity detection circuit 207B provides the polarity indication signal VP via comparing the common node voltage $V_A$ with a reference voltage Vref2 during a dead time when the high-side switch Q1 and the low-side switch Q2 are both OFF. In one embodiment, the reference voltage Vref2 is positive and smaller than the input voltage VIN.

As shown in FIG. 6, the current polarity detection circuit 207B comprises a dead time generating circuit 274, a voltage sensing circuit 275 and a comparison circuit 276. The dead time generating circuit 274 provides a dead time control signal TD based on the plurality of switching control signals for controlling the output stage circuit 201. A first input terminal of the voltage sensing circuit 275 receives the common node voltage $V_A$, and a second input terminal of the voltage sensing circuit 275 receives the dead time control signal TD. The voltage sensing circuit 275 provides a voltage sensing signal based on the dead time control signal TD. The comparison circuit 276 has a first input terminal, a second input terminal and an output terminal. The first input terminal of the comparison circuit 276 is coupled to the voltage sensing circuit 275 to receive the voltage sensing signal, and the second input terminal of the comparison circuit 276 receives the reference voltage Vref2. The comparison circuit 276 provides the polarity indication signal VP at its output terminal by comparing the voltage sensing signal and the reference voltage Vref2. One with ordinary skill in the art should understand that the detailed circuit structure of the voltage sensing circuit 275 is not limited by the example shown in FIG. 6.

In one example as shown in FIG. 6, the voltage sensing circuit 275 comprises a sampling switch S1 and a capacitor C1. The sampling switch S1 comprises a first terminal, a second terminal and a control terminal. The first terminal of the sampling switch S1 is coupled to the common node "A" to receive the common node voltage $V_A$, and the control terminal of the sampling switch S1 receives the dead time control signal TD. The second terminal of the sampling switch S1 is coupled to the comparison circuit 276 to provide the voltage sensing signal. The capacitor C1 is coupled between the second terminal of the sampling switch S1 and the ground.

Figure 7:
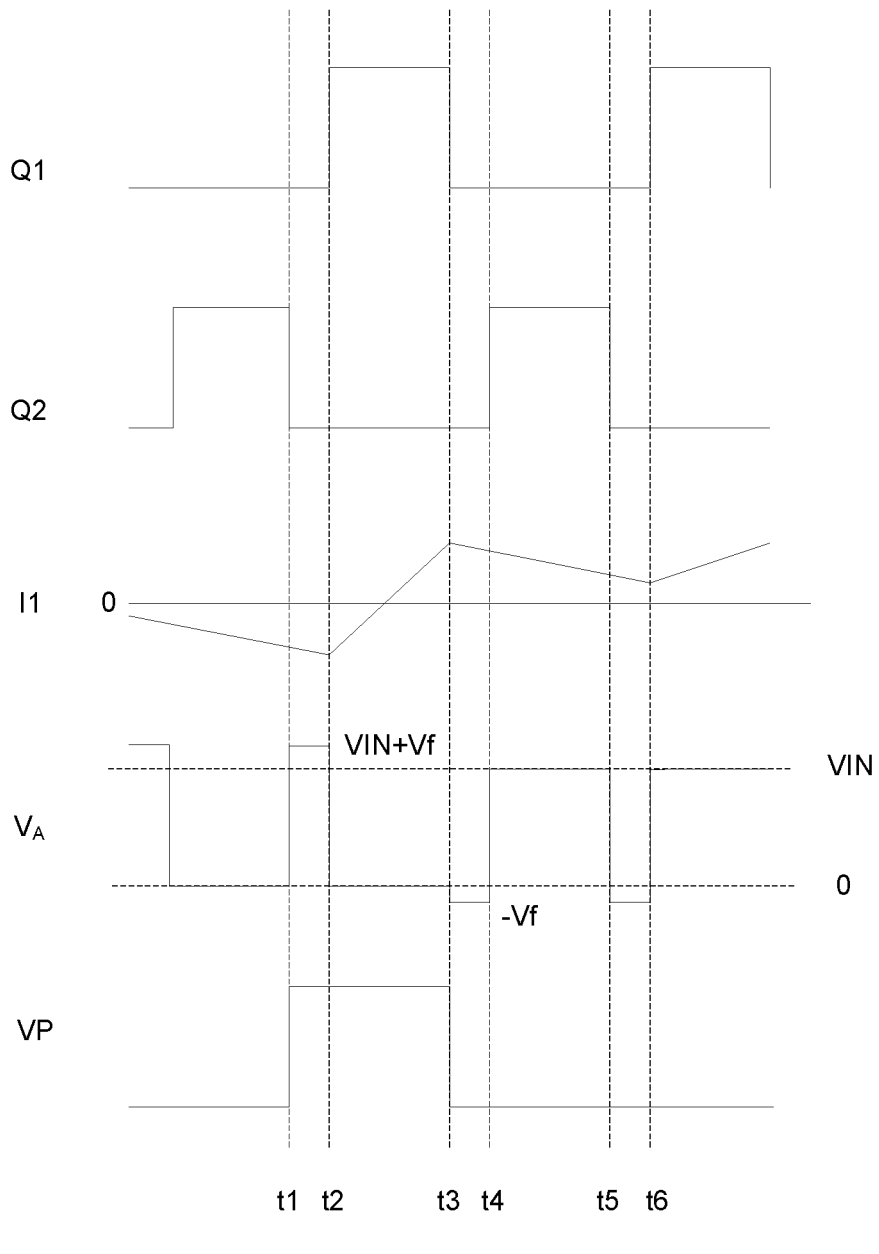
FIG. 7 shows waveforms of the motor driving circuit of FIG. 6 in accordance with an embodiment of the present invention.

FIG. 7 shows waveforms of the motor driving circuit of FIG. 6 in accordance with an embodiment of the present invention. During a time period t1-t2, a time period t3-t4 and a time period t5-t6 as shown in FIG. 7, the dead time generating circuit 274 generates the dead time control signal TD, and enables the voltage sensing circuit 275 to sample the common node voltage $V_A$. During the time period t1-t2, the common node voltage $V_A$ sampled by the voltage sensing circuit 275 is stored on the capacitor C1. During the time period t1-t2, the common node voltage $V_A$ is larger than the input voltage VIN, and the polarity indication signal VP output by the comparison circuit 276 is logic high. During the time period t3-t4, the common node voltage $V_A$ sampled by the voltage sensing circuit 275 is smaller than zero voltage, and the polarity indication signal VP output by the comparison circuit 276 is logic low. During the time period t5-t6, the common node voltage $V_A$ sampled by the voltage sensing circuit 275 is smaller than zero voltage, and the polarity indication signal VP output by the comparison circuit 276 is logic low. One with ordinary skill in the art should understand that the waveforms of the motor driving circuit of FIG. 6 is not limited by the example shown in FIG. 7.

FIG. 8 illustrates a control method 300 for a motor driving circuit in accordance with an embodiment of the present invention. The motor driving circuit comprises an output stage circuit which provides a driving current for a motor. The output stage circuit comprises a first bridge circuit and a second bridge circuit which are coupled in parallel between an input voltage and a ground. The first bridge circuit comprises a first high-side switch and a first low-side switch which are coupled in series, and the second bridge circuit comprises a second high-side switch and a second low-side switch which are coupled in series. The control method 300 comprises steps 301-304.

Step 301, choosing a first common node voltage at a common node of the first high-side switch and the first low-side switch or a second common node voltage at a common node of the second high-side switch and the second low-side switch as a chosen common node voltage based on a hall sensing signal provided by a hall sensing circuit.

Step 302, providing a comparison signal by comparing the chosen common node voltage with the input voltage.

Step 303, providing a polarity indication signal which indicates the polarity of the driving current.

In one embodiment, providing the polarity indication signal comprises coupling a sensing resistor in series with the output stage circuit, providing a current sensing signal by amplifying a voltage across the sensing resistor, and providing the polarity indication signal by comparing the current sensing signal with a first reference voltage.

In another embodiment, providing the polarity indication signal comprises comparing the first common node voltage with a second reference voltage during a dead time when the first high-side switch and the first low-side switch are both OFF. In one embodiment, the second reference voltage is smaller than the input voltage VIN and larger than zero voltage.

Step 304, determining whether to control the first low-side switch or the second low-side switch to work in the LDO mode based on the comparison signal and the polarity indication signal.

In one embodiment, when the first common node voltage is chosen, if the first common node voltage becomes larger than the input voltage and the polarity indication signal indicates that the polarity of the driving current changes from positive to negative, then the first low-side switch is configured to work in the LDO mode; and when the second common node voltage is chosen, if the second common node voltage becomes larger than the input voltage and the polarity indication signal indicates that the polarity of the driving current changes from negative to positive, then the second low-side switch is configured to work in the LDO mode.

Embodiments of the present invention are not limited by the examples. One with ordinary skill in the art should understand that the output stage circuit can also be realized using half bridge, push-pull or other topologies with similar functions.

Obviously many modifications and variations of the present invention are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

The invention claimed is:

1. A driving circuit for a motor, comprising:
an output stage circuit, configured to provide a driving current for the motor and having a first bridge circuit and a second bridge circuit coupled in parallel between an input voltage and a ground, the first bridge circuit comprises a first high-side switch and a first low-side switch coupled in series, the second bridge circuit comprises a second high-side switch and a second low-side switch coupled in series, wherein a first common node voltage is formed at a common node of the first high-side switch and the first low-side switch, and a second common node voltage is formed at a common node of the second high-side switch and the second low-side switch;
a multiplexer, configured to receive the first common node voltage, the second common node voltage, and a hall sensing signal, and configured to choose the first common node voltage or the second common node voltage as a chosen common node voltage based on the hall sensing signal;
a current polarity detection circuit, configured to provide a polarity indication signal indicating a polarity of the driving current;
a first comparison circuit, configured to provide a first comparison signal via comparing the chosen common node voltage with the input voltage; and
a reverse current control circuit, configured to determine whether to control the first low-side switch or the second low-side switch to work in a low-dropout linear regulation (LDO) mode based on the first comparison signal and the polarity indication signal; and wherein
when the first common node voltage is chosen by the multiplexer, and when the first common node voltage is larger than the input voltage and the polarity indication signal indicates that the polarity of the driving current changes the first low-side switch is configured to work in the LDO mode; and
when the second common node voltage is chosen by the multiplexer, and when the second common node voltage is larger than the input voltage and the polarity indication signal indicates that the polarity of the driving current changes, the second low-side switch is configured to work in the LDO mode.

2. The driving circuit of claim 1, wherein the current polarity detection circuit comprises:
a sensing resistor, coupled in series with the output stage circuit;

an operational amplifier, having two input terminals and an output terminal, wherein the two input terminals of the operational amplifier are coupled across the sensing resistor, and the operational amplifier is configured to sample a voltage across the sensing resistor and provide a current sensing signal at an output terminal of the operational amplifier; and
a zero crossing detection comparison circuit, configured to provide the polarity indication signal by comparing the current sensing signal with a first reference voltage.

3. The driving circuit of claim 1, wherein the current polarity detection circuit is configured to provide the polarity indication signal by comparing the first common node voltage with a second reference voltage during a time period when the first high-side switch and the first low-side switch are both OFF.

4. The driving circuit of claim 3, wherein the second reference voltage is positive and smaller than the input voltage.

5. The driving circuit of claim 3, wherein the current polarity detection circuit comprises:
a dead time generating circuit, configured to provide a dead time control signal based on the plurality of switching control signals;
a voltage sensing circuit, configured to receive the first common node voltage and the dead time control signal, and configured to provide a voltage sensing signal representative of the first common node voltage based on the dead time control signal during the time period when the first high-side switch and the first low-side switch are both OFF; and
a second comparison circuit, configured to receive the voltage sensing signal and the second reference voltage, and configured to provide the polarity indication signal via comparing the voltage sensing signal with the second reference voltage.

6. The driving circuit of claim 5, wherein the voltage sensing circuit comprises:
a sampling switch, comprising a first terminal, a second terminal and a control terminal, wherein the first terminal of the sampling switch is coupled to the common node formed by the first high-side switch and the first low-side switch to receive the first common node voltage, and the control terminal is configured to receive the dead time control signal; and
a capacitor, comprising a first terminal and a second terminal, wherein the first terminal is coupled to the second terminal of the sampling switch and the first input terminal of the second comparison circuit, and the second terminal of the capacitor is coupled to the ground.

7. The driving circuit of claim 1, wherein the output stage circuit further comprises a third bridge circuit, and wherein the third bridge circuit is coupled in parallel with the first bridge circuit and the second bridge circuit, and is configured to provide the driving current for a three-phase motor.

8. A driving circuit for a motor, comprising:
a first bridge circuit and a second bridge circuit, coupled in parallel between an input voltage and a ground to provide a driving current for the motor, the first bridge circuit comprises a first high-side switch and a first low-side switch coupled in series, and the second bridge circuit comprises a second high-side switch and a second low-side switch coupled in series, wherein a first common node voltage is developed at a common node of the first high-side switch and the first low-side switch, and a second common node voltage is developed at a common node of the second high-side switch and the second low-side switch; and a reverse current control circuit, configured to determine whether to control the first low-side switch or the second low-side switch to work in a low-dropout linear regulation (LDO) mode, and wherein when the first common node voltage is chosen based on a hall sense signal, and when the first common node voltage is larger than the input voltage and a polarity indication signal indicates that a polarity of the driving current changes from positive to negative, the first low-side switch is configured to work in the LDO mode; and wherein when the second common node voltage is chosen based on the hall sense signal, and when the second common node voltage is larger than the input voltage and the polarity indication signal indicates that the polarity of the driving current changes from negative to positive, the second low-side switch is configured to work in the LDO mode.

9. The driving circuit of claim 8, further comprising:

a hall sensing circuit, configured to provide the hall sensing signal;

a multiplexer, configured to choose the first common node voltage or the second common node voltage to be compared with the input voltage based on the hall sensing signal; and a current polarity detection circuit, configured to provide the polarity indication signal.

10. The driving circuit of claim 9, wherein the current polarity detection circuit comprises:

a sensing resistor, coupled in series with the output stage circuit;

an operational amplifier, having two input terminals and an output terminal, wherein the two input terminals of the operational amplifier are coupled across the sensing resistor, and the operational amplifier is configured to sample a voltage across the sensing resistor and provide a current sensing signal at an output terminal of the operational amplifier; and a zero crossing detection comparison circuit, having two input terminals and an output terminal, wherein the zero crossing detection comparison circuit is configured to compare the current sensing signal with a first reference voltage, and provide the polarity indication signal at the output terminal of the zero crossing detection comparison circuit.

11. The driving circuit of claim 9, wherein the current polarity detection circuit is configured to provide the polarity indication signal by comparing the first common node voltage with a second reference voltage during a time period when the first high-side switch and the first low-side switch are both OFF, and wherein the second reference voltage is smaller than the input voltage and larger than zero voltage.

12. The driving circuit of claim 11, wherein the current polarity detection circuit comprises:

a dead time generating circuit, configured to provide a dead time control signal based on a plurality of switching control signals, wherein the plurality of switching control signals are used to control the first bridge circuit and the second bridge circuit;

a voltage sensing circuit, comprising a first input terminal, a second input terminal and an output terminal, wherein the first input terminal of the voltage sensing circuit is coupled to the common node of the first high-side switch and the first low-side switch to receive the first common node voltage, the second input terminal of the voltage sensing circuit is coupled to the dead time generating circuit to receive the dead time control signal, and the output terminal of the voltage sensing circuit is configured to provide a voltage sensing signal representative of the first common node voltage based on the dead time control signal during the time period when the first high-side switch and the first low-side switch are both OFF; and a second comparison circuit, comprising a first input terminal, a second input terminal and an output terminal, wherein the first input terminal of the second comparison circuit is coupled to the voltage sensing circuit to receive the voltage sensing signal, the second input terminal of the second comparison circuit is configured to receive the second reference voltage, and the second comparison circuit is configured to generate the polarity indication signal by comparing the voltage sensing signal with the second reference voltage and to provide the polarity indication signal at the output terminal of the second comparison circuit.

13. The driving circuit of claim 12, wherein the voltage sensing circuit further comprises:

a sampling switch, comprising a first terminal, a second terminal and a control terminal, wherein the first terminal of the sampling switch is coupled to the common node formed by the first high-side switch and the first low-side switch to receive the first common node voltage, and the control terminal is configured to receive the dead time control signal; and a capacitor, comprising a first terminal and a second terminal, wherein the first terminal is coupled to the second terminal of the sampling switch and the first input terminal of the second comparison circuit, and the second terminal of the capacitor is coupled to the ground.

14. The driving circuit of claim 8, further comprising a third bridge circuit, wherein the third bridge circuit is coupled in parallel with the first bridge circuit and the second bridge circuit between the input voltage and the ground.

15. A control method for a driving circuit with a first bridge circuit and a second bridge circuit coupled in parallel between an input voltage and a ground to provide a driving current for a motor, the control method comprising:

choosing a first common node voltage at a common node formed by a first high-side switch and a first low-side switch of the first bridge circuit or a second common node voltage at a common node formed by a second high-side switch and a second low-side switch of the second bridge circuit as a chosen common node voltage based on a hall sensing signal; and determining whether to control the first low-side switch or the second low-side switch to work in a low-dropout linear regulation (LDO) mode; and wherein when the first common node voltage is chosen, and when the first common node voltage is larger than the input voltage and a polarity indication signal indicates that a polarity of the driving current changes, controlling the first low-side switch to work in the LDO mode; and when the second common node voltage is chosen, and when the second common node voltage is larger than the input voltage and the polarity indication signal indicates that the polarity of the driving current changes, controlling the second low-side switch to work in the LDO mode.

16. The control method of claim 15, further comprises:

coupling a sensing resistor in series to the first bridge circuit or the second bridge circuit;

providing a current sensing signal by sampling a voltage across the sensing resistor; and providing the polarity indication signal by comparing the current sensing signal with a first reference voltage.

17. The control method of claim 15, further comprises:

providing the polarity indication signal by comparing the first common node voltage with a second reference voltage during a time period when the first high-side switch and the first low-side switch are both OFF.

18. The control method of claim 17, wherein the second reference voltage is smaller than the input voltage and larger than zero voltage.

\* \* \* \* \*